United States Patent [19]

Schiefer et al.

[11] Patent Number: 5,542,073

[45] Date of Patent: *Jul. 30, 1996

[54] COMPUTER PROGRAM PRODUCT FOR CHOOSING LARGEST SELECTIVITIES AMONG ELIGIBLE PREDICATES OF JOIN EQUIVALENCE CLASSES FOR QUERY OPTIMIZATION

[75] Inventors: Klaus B. Schiefer, Scarborough, Canada; Arun N. Swami, San Jose, Calif.

[73] Assignee: International Business Machines Corporation, Armonk, N.Y.

[ * ] Notice: The term of this patent shall not extend beyond the expiration date of Pat. No. 5,469,568.

[21] Appl. No.: 510,078

[22] Filed: Aug. 1, 1995

Related U.S. Application Data

[62] Division of Ser. No. 1,492, Jan. 7, 1993, Pat. No. 5,469,568.
[51] Int. Cl.$^6$ ................................................... G06F 17/30
[52] U.S. Cl. .................... 395/600; 364/DIG. 1; 364/283.4
[58] Field of Search ................................................ 395/600

[56] References Cited

U.S. PATENT DOCUMENTS

| | | | |
|---|---|---|---|
| 4,774,657 | 9/1988 | Anderson et al. | 364/200 |
| 5,091,852 | 2/1992 | Tsuchida et al. | 395/600 |
| 5,287,493 | 2/1994 | Jacopi | 395/600 |
| 5,301,317 | 4/1994 | Lohman et al. | 395/600 |
| 5,325,525 | 6/1994 | Shan et al. | 395/650 |
| 5,335,345 | 8/1994 | Frieder et al. | 395/600 |
| 5,345,585 | 9/1994 | Iyer et al. | 395/600 |
| 5,367,675 | 11/1994 | Cheng et al. | 395/600 |
| 5,412,804 | 4/1995 | Krisna | 395/600 |
| 5,412,806 | 5/1995 | Du et al. | 395/600 |
| 5,423,035 | 6/1995 | De Prez | 395/600 |
| 5,469,568 | 11/1995 | Schiefer et al. | 395/600 |

OTHER PUBLICATIONS

P. J. Haas and A. N. Swami, Sequential Sampling Procedures for Query Size Estimation, Proceedings of the 1992 ACM SIGMOD International Conference on Mangement of Data, SIGMOD Record, vol. 21, Issue 2, Jun. 1992.

T. Y. Cheung, A Statistical Model for Estimating the Number of Records in a Relational Database, Info. Process. Lett. (Netherlands), vol. 15, No. 3, pp. 115–118, Oct. 1982.

T. Mostardi, Estimating the Size of Relational SPOJ Operation Results: An Analytical Approach, Info. Sys. vol. 15, No. 5, pp. 591–601, 1990.

A. S. Rosenthal, Note on the Expected Size of a Join, ACM, SIGMOD Record vol. 11, No. 4, Jul. 1981.

S. Christodoulakis, Estimating Block Transfers and Join Sizes, ACM, IEEE vol. 13, No. 4, pp. 40–54, pp. 40–54, May 1983.

B. Da et al., Pragmatic Estimation of Join Sizes and Attribute Correlations, Proceedings Fifth International Conference on Data Engineering, pp. 76–84, 1989.

M. V. Mannino et al., Statistical Profile Estimation in Database Systems, Comput. Surv. (USA), vol. 20, No. 3, pp. 191–221, Sep. 1988.

(List continued on next page.)

*Primary Examiner*—Wayne Amsbury
*Attorney, Agent, or Firm*—James C. Pintner

[57] ABSTRACT

A method for choosing join selectivities in a query optimizer in a relational database management system is disclosed which facilitates the estimation of join result sizes by a query optimizer in a relational database system, wherein a new relation R is to be joined with an intermediate relation I, and wherein the selectivity values for each eligible join predicate are known. The method has the steps of determining the equivalence classes for a plurality of join attributes and then computing for each relation an estimate of the cardinality and the number of distinct values in each attribute after all the local predicates have been included. These are used in further computation of join selectivities and join result sizes. The join predicates must then be processed by correctly choosing the join selectivities. The join result sizes can then be correctly calculated.

1 Claim, 1 Drawing Sheet

OTHER PUBLICATIONS

J. Y. Tien et al., Comments on "Hash–based and Index––Based Join Algorithms for Cube and Ring Connected Multicomputers", IEEE Trans. Knowl, Data Eng. (USA), vol. 3, No. 3, pp. 387–389, Sep. 1991.

D. Gardy, et al., On the Effect of Join Operations on Relation Sizes, ACM Trans. Database Syste. (USA), vol. 14, No. 4, pp. 574–603, Dec. 1989.

J. M. Lee et al., An Upper Bound on Buffer Size for Join Operation Using Nonclustered Indexes, Info. Process. Lett. (Netherlands), vol. 36, No. 2, pp. 85–90, 15 Oct. 1990.

A. Kumar et al., The Effect of Join Selectivities on Optimal Nesting Order, ACM, SIGMOD Record, vol. 16, No. 1, pp. 28–41, Mar. 1987.

R. J. Lipton et al., Practical Selectivity Estimation through Adaptive Sampling, ACM, SIGMOD International Conf. on Management of Data, Atlantic City, USA, May 23–25 May 1990.

P. Valduriez et al., Join and Semijoin Algorithms for a Multiprocessor Database Machine, ACM Transactions on Database Systems, vol. 9, No. 1, pp. 133–161, Mar. 1984.

T. Ibaraki et al., On the Optimal Nesting Order for Computing N–Relational Joins, ACM Transactions on Database Systems, vol. 9, No. 3, pp. 482–502, Sep. 1984.

D. M. Dias et al., Methods for Improving the Efficiency of Parallel Sort Merge Joins in the Presence of Data Skew, IBM Technical Disclosure Bulletin, vol. 33 No. 10A, pp. 166–167, Mar. 1991.

M. N. Wegman, Method of Estimating the Size of a Set, IBM Technical Disclosure Bulletin, vol. 16, No. 7B, pp. 3893–3894, Dec. 1983.

Swami et al., Computer Database System Using a Polynomial Time Algorithm for Optimizing, Ser. #07/801,306 filed 11/12/91 (IBM Doc. #SA991076).

Elmasri et al., Fundamentals of Database Systems, Benjamin/Cummings 1989, pp. 502–505.

COMPUTER PROGRAM PRODUCT FOR CHOOSING LARGEST SELECTIVITIES AMONG ELIGIBLE PREDICATES OF JOIN EQUIVALENCE CLASSES FOR QUERY OPTIMIZATION

This is a divisional of application Ser. No. 08/001,492 filed on Jan. 7, 1993, now U.S. Pat. No. 5,469,568.

FIELD OF THE INVENTION

Broadly conceived, the present invention relates to relational database management systems, and in particular, to methods for choosing join selectivities in the art of query optimization.

BACKGROUND HISTORY

Computer systems employ a relational database management system or a RDBMS which is a computer program that manages data storage and retrieval. Many RDBMS are being widely used because they permit the database users to enter queries into the database in order to extract requested data.

The data is present within the database system in one or more tables or relations. Each relation consists of a number of records or tuples containing specific information grouped in some sequence. Each tuple consists of one or more fields which are called attributes. In any single attribute of a tuple or information there can be only a single value, however, different tuples can have different values for the same attribute. As an example, a relation called EMPLOYEE contains information about employees. The relation consists of a number of tuples where each tuple corresponds to one employee. For instance, the tuple can have the attributes (Emp_Name), (Age), and (Dept_No) representing the name of the employee, the age of the employee, and the department the employee works for.

Two kinds of statistics are typically important to proper management by the RDBMS of the database's stored relations. One is the number of tuples contained in a single relation. This value is known as the relation's cardinality and is denoted by $\|R\|$, wherein R is the relation. The second is the number of distinct values taken by an attribute denoted by $d_a$, wherein (a) is the attribute. The value of the relation's cardinality, $\|R\|$, is important because it indicates the overall size of the relation. The number of distinct values, $d_a$, is important because it is used to determine the size of the results from different operations on the relation data.

One database query language is known as SQL. With such a query language the users do not have to be aware of the physical locations of the data or the methods used to access the data. To the database user, all the information that is stored within the database is accessible by a query which is a request by the user for some database information. The database user enters in an SQL command and the RDBMS decides how the data should be retrieved and initiates the data retrieval.

In order for the RDBMS to be effective as a database information manager, the RDBMS uses several operations to enhance the obtaining of the data desired by the user in the SQL command. One of the most important operations relied upon by the database management system is the join operation. We use the symbol U to denote the join operation. A join operation is used to match tuples from two relations on the values taken from each relation on one common attribute. For example, let one relation be the entire DEPARTMENT relation having, for instance, attributes called (Dept_Name) and (Dept_No). Let another relation be the EMPLOYEE relation having attributes (Emp_Name) and (Dept_No). In order to obtain for each employee the name of the department that the employee works for, the RDBMS must join the relations EMPLOYEE and DEPARTMENT on the common attribute (Dept_No). The join is specified by a join predicate which describes the attributes to be matched. In this example, the join predicate can be expressed as (EMPLOYEE.Dept_No=DEPARTMENT.Dept_No). The resulting effect of the join operation is that for each tuple in the EMPLOYEE relation the RDMBS locates the tuple in the DEPARTMENT relation with the same value in the attribute (Dept_No). After this is complete, the RDBMS can return for each employee the name of the department, i.e., (Dept_Name) that the employee works for.

Another important operation performed by the RDBMS in response to an SQL query command is the selection operation which is used to locate and select only those particular tuples matching a certain criterion or condition obtained from one relation. For instance, user may choose to retrieve all employees who are older than age 50 years, and this operation is described by a local predicate expressed as (EMPLOYEE.Age >50).

A single query entered into an RDBMS may result in multiple operations being performed in order to conduct a more complex query in the shortest amount of time. Multiple local predicates on one or more relations can be used together with multiple join operations in the same query. For example, the query may combine the selection and join operations in order to retrieve the results for all employees who are older than 50 years together with all the names of the departments for which these employees work.

When the selection or join operation is actually performed, the local or join predicate is said to be evaluated by the RDBMS. For the relation involved in a join predicate, the specific attribute that is present in the join predicate is called the join predicate's attribute or join attribute of the relation.

If a local predicate is present, the local predicate may serve to reduce the cardinality of the relation. As an example, given the full EMPLOYEE relation and the local predicate (EMPLOYEE.Age >50), performing the selection operation involving the local predicate serves to extract only those employees whose ages are greater than 50. The number of employees in this result is clearly smaller than the number of employees in the full EMPLOYEE relation. This reduced cardinality is called the effective cardinality of the relation. It can be used in other cardinality calculations, e.g., for estimating join result sizes. The local predicates can change the effective cardinality of the relation and the number of distinct values in the attributes of the relation thus changing the size of the final join result. What is also needed in the art is an algorithm for taking the effect of local predicates into account.

When a relation is joined with another relation, it creates a resulting relation. If some other relations need to be joined with the first result relation, the result relation is often referred to as an intermediate relation because it is created in the process of generating a final result relation. An intermediate relation I may be the result of joining several relations. These joined relations are said to be present in the intermediate relation I.

A relation and its attributes may participate in several join predicates. In a particular ordering of the join operations in a query when a relation R is joined with another (possibly intermediate) relation I, not all of the join predicates can be evaluated at any one time. Only those join predicates linking attributes in relation R with the corresponding attributes in a second relation S which is present in relation I, can be evaluated. These particular join predicates are termed eligible join predicates because only these join predicates can be evaluated at this point in time.

A database system user retrieves data from the database by entering requests or queries into the database. The RDBMS interprets the user's query and then determines how best to go about retrieving the requested data. In order to achieve this, the RDBMS has a component called the query optimizer. The RDBMS uses a query optimizer to analyze how to best conduct the user's query of the database; optimum speed in accessing being the underlying motivation. The query optimizer takes the query and generates what is called a query plan. The query plan is a manipulation or rearrangement of the user's SQL commands, in some instances eliminating redundancies, in order to simplify the query prior to processing. There may be several alternative query plans generated by the query optimizer, each specifying a set of operations to be executed by the RDBMS. The many query plans generated for a single query ultimately differ in their total cost of obtaining the desired data. The query optimizer then evaluates these cost estimates for each query plan in order to determine which plan has the lowest execution cost. In order to determine a query plan with the lowest execution cost, the query optimizer uses specific combinations of operations to collect and retrieve the desired data. When a query plan is finally selected and executed, the data requested by the user is retrieved according to that specific query plan however manipulated or rearranged.

One of the most expensive operations to conduct is the join operation which joins together two or more entire relations which can be fairly large. When multiple joins are present in a user generated query, as is typically the case the cost increases dramatically. The query optimizer has to determine the execution order in which the relations will eventually be joined so as to minimize cost. The join ordering chosen by the query optimizer is important for the determination of the lowest cost query plan.

In order to choose between different join orderings, the query optimizer needs to estimate the eventual result size or cardinality of the two joined relations. In other words, the result size of the join operation $R_1 \cup R_2 \cup R_3$ depends on the $\|R_1\|$, $\|R_2\|$, $\|R_3\|$, $\|R_1 \cup R_2\|$, $\|R_2 \cup R_3\|$, and $\|R_1 \cup R_3\|$. Note that the join of $R_1 \cup R_2$ produces an intermediate result the size of which is going to depend on $\|R_1\|$ and $\|R_2\|$.

When intermediate relations are involved, the query optimizer estimates the final join result sizes incrementally, i.e., first determine the size of joining the first two relations, then determine the size of the join with a third relation, and so on. In such a manner, the query optimizer incrementally estimates the final join result size from the result sizes of the intermediate relations produced.

Another situation in the incremental calculation of join result sizes arises when two or more of the eligible join predicates involve join attributes of the new relation having the same equivalence class. Two attributes are considered to belong to the same equivalence class when they are linked by a join predicate. For example, consider a relation $R_1$ joining with relation $R_2$ with the following join predicates: $(R_1.a=R_2.b)$, $(R_1.c=R_2.d)$ and $(R_1.a=R_1.c)$. When $R_1$ is joined with $R_2$, the first two join predicates are eligible. They involve attributes (a) and (c) of $R_1$ that belong to the same equivalence class by virtue of the join predicate $(R_1.a=R_1.c)$.

Current query optimizers do not treat this as a special case, and therefore by default, the join selectivities of all such join predicates are used for calculation of the join result sizes which produces an incorrect result because the join attributes are not independent. What is needed in the art is a join result size method which handles the case wherein two or more of the eligible join predicates involve join attributes of the new relation having the same equivalence class.

Next, consider a join predicate $(J:(R_1.a=R_2.b))$, where $R_1$ is a relation having an attribute (a) and $R_2$ is a relation having an attribute (b). For each join predicate, e.g., $(J:(R_1.a=R_2.b))$, another quantity called the selectivity needs to be estimated by the query optimizer. This selectivity is a value which is a fractional number between 0 and 1. In the example, the selectivity of join predicate J, which is denoted by $S_J$, is given typically as $S_J=1/\max(d_a, d_b)$. The size or the result of joining of $R_1$ and $R_2$ is given by $\|R_1\| \times \|R_2\| \times S_J$.

Initially, each join attribute is given an equivalence class and two join attributes are given the same equivalence class if they are linked by the same join predicate. Two linked join predicates can then be transitively closed if they share a common join attribute in order to obtain another join predicate. Thus, given join predicates $(J1:(R_1.x=R_2.y)$ AND $J2:(R_2.y=R_3.z))$, one can obtain the join predicate $(J3:(R_1.x=R_3.z))$ using the principle of transitivity. Since join attributes (x) and (y) are given the same equivalence class and since join attributes (y) and (z) are given the same equivalence class, it follows that attributes (x), (y) and (z) must be given the same equivalence class. This is important because when attributes are in the same equivalence class, the effects of joining them are no longer independent. As an example, once join predicates J1 and J2 have been evaluated, J3 has been evaluated effectively and hence evaluating it can have no further effect on the size of the join result. This indicates the importance of carefully choosing the join selectivities to multiply.

Given a series of relations that are to be joined, as discussed the join result sizes are calculated incrementally in the art. Join estimations in the art use either a multiplicative approach or a single selectivity approach, both of which produce incorrect join result sizes in certain cases.

In the multiplicative prior art approach, the selectivities of all the eligible join predicates are multiplied together along with the product of the individual relation cardinalities. The following example illustrates that this approach produces incorrect results in certain cases because the selectivities are not independent.

For example, let the following be an SQL statement entered as a query into a database:

SELECT $R_1.u$

FROM $R_1, R_2, R_3$

WHERE $(R_1.x=R_2.y)$ AND $(R_2.y=R_3.z)$ AND $(R_1.x=R_3.z)$

The join predicates here are $(R_1.x=R_2.y)$, $(R_2.y=R_3.z)$ and $(R_1.x=R_3.z)$. Let the statistics for these relations in the database be as follows:

$\|R_1\|=100$, $d_x=10$ $\|R_2\|=1000$, $d_y=100$ $\|R_3\|=1000$, $d_z=1000$

Ja:$(R_1.x=R_2.y)$, $S_{Ja}=1/\max(d_x, d_y)=1/\max(10,100)=0.01$

Jb:$(R_2.y=R_3.z)$, $S_{Jb}=1/\max(d_y, d_z)=1/\max(100,1000)=0.001$

Jc:$(R_1.x=R_3.z)$, $S_{Jc}=1/\max(d_x, d_z)=1/\max(10,1000)=0.001$

Using the semantics of the join operation with the selectivities above denoted by $S_{Ja}$, $S_{Jb}$, and $S_{Jc}$, the correct result size for $\|R_1 \cup R_2 \cup R_3\|$ is known to be 1000. Now, let $R_2$ be first joined with $R_3$, i.e., let the intermediate result relation $I$ be $R_2 \cup R_3$, then:

$$\|R_2 \cup R_3\| = \|R_2\| \times \|R_3\| \times S_{Jb}$$

$$\|R_2 \cup R_3\| = 1000 \times 1000 \times 0.001$$

$$\|R_2 \cup R_3\| = 1000$$

In the join of $R_1$, the multiplicative approach produces the join result size as follows:

$$\|R_2 \cup R_3 \cup R_1\| = \|I\| \times \|R_1\| \times S_{Ja} \times S_{Jc}$$

$$\|R_2 \cup R_3 \cup R_1\| = 1000 \times 100 \times 0.01 \times 0.001$$

$$\|R_2 \cup R_3 \cup R_1\| = 1 \text{ (incorrect)}$$

As shown above, the multiplicative approach produced an incorrect join result size of 1 in the simple example above because of the selectivities being factored in without change.

Another approach in the prior art in producing join result sizes is to make a single selection from the set of join selectivities available in order to calculate the join result sizes by dividing the eligible join predicates into groups. Then, choosing for each group a single join predicate and its particular join selectivity value to calculate the intermediate and final join result sizes. Such an approach chooses one join selectivity from each group, wherein the groups of join attributes are associated by equivalence classes by the RDBMS.

The single selectivity approach is typically used to pick the smallest join selectivity in each group among all the available join selectivities. This can produce incorrect results in certain cases. In the above example, once $R_2$ and $R_3$ have been joined, $R_1$ can be joined to $R_2 \cup R_3$ using the join predicates $Ja:(R_1.x=R_2.y)$ and $Jc:(R_1.x=R_3.z)$. These predicates involve the same join attribute (x) of relation $R_1$. In the single selectivity approach, only one of the join predicate selectivities is used, in particular, the smaller of the join selectivities. Since selectivity $(S_{Jc} < S_{Ja})$, the single selectivity approach, for the identical problem, produces the join result size as follows:

$$\|R_2 \cup R_3 \cup R_1\| = \|I\| \times \|R_1\| \times S_{Jc}$$

$$\|R_2 \cup R_3 \cup R_1\| = 1000 \times 100 \times 0.001$$

$$\|R_2 \cup R_3 \cup R_1\| = 100 \text{ (incorrect)}$$

As shown above, the single selectivity approach produced an incorrect join result size of 100 in this example simply because the wrong join selectivity was chosen.

Therefore, what is also needed in the art is a method for correctly choosing the join selectivities for query optimization so as to produce correct join result sizes.

SUMMARY AND OBJECTS OF THE INVENTION

The present invention relates to methods for choosing join selectivities for query optimization.

It is a primary object of the present invention to provide a method that correctly chooses the join selectivities to be used when calculating join result sizes.

It is another primary object of the present invention to provide a method for calculating the join selectivities that handles the case when two or more eligible join predicates involve the same join attribute of the new relation.

It is another primary object of the present invention to provide a method for calculating the join selectivities that handles the case when two or more of the eligible join predicates involve join attributes of the new relation having the same equivalence class.

It is another object of the present invention to provide a method that takes the effect of local predicates into account.

Briefly and to achieve the foregoing objects in accordance with the present invention as embodied and broadly described herein, a method for choosing join selectivities in a query optimizer in a relational database management system is disclosed which facilitates the estimation of join result sizes by a query optimizer in a relational database system, wherein a new relation R is to be joined with an intermediate relation I, and wherein the selectivity values for each eligible join predicate are known. The present method has the steps of determining the equivalence classes for a plurality of join attributes and then computing for each relation, an estimate of the cardinality and the number of distinct values in each attribute after all the local predicates have been included. These are used in further computation of join selectivities and join result sizes. The join predicates must then be processed by correctly choosing the join selectivities. The join result sizes can then be correctly calculated.

Additional objects and advantages of the present invention will be set forth in the description which follows, and in part will be obvious from the description or may be learned by the practice of this invention. The objects of this invention as described herein may be realized and obtained by means particularly pointed out and distinctly claimed in the appended claims taken in conjunction with the detailed specification.

DETAILED DESCRIPTION OF THE PREFERRED EMBODIMENT

Figure 1:
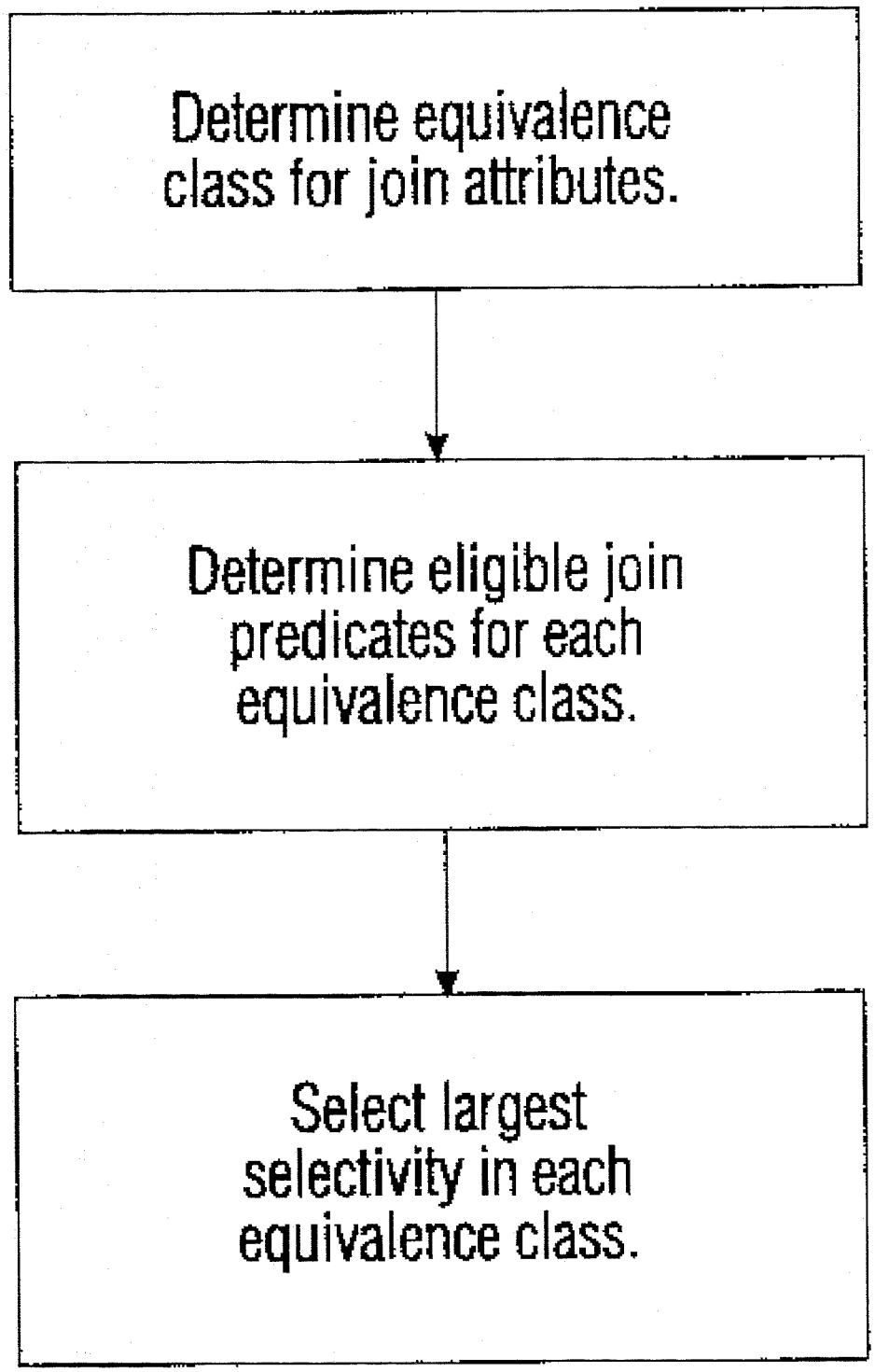
FIG. 1 is a flow diagram illustrating the processing steps of this invention.

The join is an important operation in relational database management systems. The estimation of join result sizes in a query is important because the estimates have a significant influence on the query evaluation plan chosen by the query optimizer. Accurate estimation of join result sizes is hence crucial in query optimization. Typically, the join result is estimated as the product of the cardinalities of the operand relations after applying any predicates involving only the individual relations (local predicates) and the join predicates. When queries contain equality predicates, either local or join predicates, it is possible to derive additional local or join predicates using transitive closure. Performing predicate transitive closure gives the query optimizer maximum freedom to vary the join ordering and ensures that the same query evaluation plan is generated for equivalent queries independent of how the queries are specified by the user.

It should be understood that a preprocessing phase should be performed before any join result sizes can be estimated. In the preprocessing phase, one generates all the predicates using transitive closure and determines the equivalence classes for all the join attributes. Selectivities are assigned to the local predicates. All this information is necessary disclosure to choose the join selectivities. In particular for preprocessing, it is important to examine each given predicate. If the predicate is identical to another predicate, the predicate is removed. This is to handle queries like the following:

SELECT $R_1.x$

FROM $R_1$

WHERE $(R_1.x>500)$ AND $(R_1.x>500)$

Equivalence classes should be built for all equality predicates in order to produce all the predicates that can be generated and to assign equivalence classes to the join attributes.

It is also important to create new predicates using transitive closure. There are five variations to consider:

(1) Two join predicates can imply another join predicate.

$(R_1.x=R_2.y)$ AND $(R_2.y=R_3.z) \rightarrow (R_1.x=R_3.z)$.

(2) Two join predicates can imply a local predicate.

$(R_1.x=R_2.y)$ AND $(R_1.x=R_2.w) \rightarrow (R_2.y=R_2.w)$.

(3) Two local predicates can imply another local predicate.

$(R_1.x=R_1.y)$ AND $(R_1.y=R_1.z) \rightarrow (R_1.x=R_1.z)$.

(4) A join predicate and a local predicate can imply a join predicate.

$(R_1.x=R_2.y)$ AND $(R_1.x=R_1.z) \rightarrow (R_2.y=R_1.z)$.

(5) A join predicate and a local predicate can imply a local predicate.

Here, 'op' denotes a comparison operator and 'c' is a constant.

$(R_1.x=R_2.y)$ AND $(R_1.x$ op $c) \rightarrow (R_2.y$ op $c)$.

Note that in the first four variations only local predicates that involve equality between two columns are considered.

One skilled in the art should be familiar with how the equivalence classes of join attributes are obtained. Such techniques are straightforward and well known in the art. One way to form the equivalence classes is to consider the following. Initially, each attribute is in an equivalence class by itself. Equivalence classes capture the notion that attributes belonging to the same equivalence class are not independent in determining result sizes. For each equality local or join predicate, if the participating attributes are not in the same equivalence class, merge the equivalence classes to which the attributes belong. When all the equality predicates in the query have been processed, the final equivalence classes become available. Since equivalence classes are assigned for each attribute, multiple attributes of the same relation could be assigned the same equivalence class and attributes from different relations could also be assigned the same equivalence class.

The preferred embodiment of the present invention for choosing join selectivities to facilitate the estimation of join result sizes by a query optimizer in a relational database system, wherein a new relation R is to be joined with an intermediate relation I, has three basic steps which are called herein BASIC STEP 0, 1, and 2. The above referenced steps are illustrated at their simplest level in FIG. 1. The BASIC STEP 0, 1, and 2 are each described in detail below.

In BASIC STEP 0 of the present method, compute, for each relation, an estimate of the cardinality of each relation and the number of distinct values in each attribute after all the local predicates have been included. These new estimates are used in further computation of join selectivities and join result sizes. Since estimates of the cardinality of each relation and the number of distinct values in each attribute are simple steps, a pseudocode version is not provided herein. One skilled in the art should be able to readily obtain these values from the database system.

With respect to this first method step, the effect of the local predicates must be incorporated in the join result sizes because local predicates can reduce the number of tuples participating in the join. When the local predicate is on the joining attribute, the predicate can also reduce the number of distinct values in the joining attribute. Thus, the local predicates will affect join result sizes since the predicates affect both the number of participating tuples and possibly the number of distinct values in the joining attributes.

For instance, let relation R be one of the relations participating in a join operation. Let the join attribute of relation R be (x) and let the local predicate be directed to attribute (y) of relation R. Note that (y) may be identical with (x). Let $\|R\|$ denote the cardinality of relation R before the local predicate is applied and let $\|R\|'$ denote the cardinality of relation R after the local predicate is applied. Also, $d_x$ is the number of distinct values of attribute (x) before the local predicate is applied, and $d_x'$ is the number of distinct values of attribute (x) after the local predicate is applied. Similarly, define $d_y$ and $d_y'$, wherein $d_y$ is the number of distinct values of attribute (y) before the local predicate is applied and $d_y'$ is the number of distinct values of attribute (y) after the local predicate is applied. The values of $\|R\|'$ and $d_y'$ depend on the local predicate and the information available about the attribute (y). For example, if the local predicate is of the form (y)=(a), where (a) is a literal, then $d_y'=1$ and the local predicate selectivity is given as $1/d_y$. For some other local predicate $L_p$ involving attribute (y), if the local predicate selectivity $S_{L_p}$ is known, $\|R\|'=\|R\| \times S_{L_p}$ and $d_y'=d_y \times S_{L_p}$.

Once $\|R\|'$ and $d_y'$ have been estimated, there are two cases for estimating $d_x'$. In the first case, where attribute (y) is distinct from attribute (x), $d_x'$ is estimated as $d_x'=\min(\|R\|', d_x)$, i.e., the join attributes are considered to be independent so that there is no correlation between the values assumed by the join attributes. In the second case, where attribute (y) is identical with attribute (x), $d_x'=d_y'$.

It should be understood that the present invention treats both local predicates and join predicates together to get join result sizes and the present method takes advantage of distribution statistics on attributes that are involved in local predicates so as to obtain more accurate join result sizes.

Note that at this point the new relation and distinct value estimates have already incorporated all local predicates. Therefore, the present method takes the effect of local predicates into account.

In the further processing, the join selectivity has to be computed for each join predicate. If two join attributes from the same relation are in the same equivalence class, special care is needed in the computation of the join selectivities. The following is an example of why special care is needed.

Consider the following example query involving attributes from the same relation that belong to the same equivalence class and are involved in join predicates:

SELECT $R_1.z$

FROM $R_1, R_2$

WHERE $(R_1.x=R_2.y)$ AND $(R_1.x=R_2.w)$

After transitive closure of predicates, the following becomes the transformed query:

SELECT $R_1.z$
FROM $R_1, R_2$
WHERE $(R_1.x=R_2.y)$ AND $(R_1.x=R_2.w)$ AND $(R_2.y=R_2.w)$

Here, it should be appreciated that the implied local predicate $(R_2.y=R_2.w)$ has been added using the 2-nd variation of the newly created predicate involving transitive closure, i.e., two join predicates can imply a local predicate such as:

$(R_1.x=R_2.y)$ AND $(R_1.x=R_2.w) \rightarrow (R_2.y=R_2.w)$.

Now, let the statistics for the relations in the query be:

$\|R_1\|=100, d_x=100$ $\|R_2\|=1000, d_y=10, d_w=50$

After transitive closure, $R_2.y$ participates in every join in which $R_2.w$ participates and vice-versa. Hence, for computing join selectivities and join result sizes, the number of tuples in relation $R_2$, which qualify under the local predicate, must be determined as well as the number of distinct values that the qualifying tuples contain.

For a given relation $R_2$ with two equivalent attributes $(R_2.w)$ and $(R_2.y)$. The assumption is that the domain of the relation join attribute with the smaller number of distinct values is a subset of the domain of the relation join attribute with the larger number of distinct values. In this example, let all the distinct values $d_y$ be contained in the distinct values $d_w$. Next, consider any tuple of relation $R_2$. It has some value q in attribute $(R_2.y)$. Assuming the independence of attributes $(R_2.y)$ and $(R_2.w)$, the probability that another tuple has the same value q for its attributes is $(1/d_w)$. Since this is the case for every tuple of relation $R_2$, the effective cardinality of relation $R_2$ in joins on attributes $(R_2.w)$ or $(R_2.y)$ is given by $\|R_2\|'$, where $$\|R_2\|' = \left\lceil \frac{\|R_2\|}{d_w} \right\rceil$$

(or the ceiling of the cardinality of relation $R_2$ over the number of distinct values $d_w$). Once this selection has been performed, only one of the attributes needs to be joined since the other join is redundant. The number of distinct values that should be used for join selectivity computations is given as $\min(d_y, \|R_2\|')$. Thus, the effective number of distinct values in joins is given as $\min(d_y, \|R_2\|')=\min(10,20)=10$. In our example query, $$\|R_2\|' = \frac{\|R_2\|}{d_w} = \frac{1000}{50} = 20.$$

This can be generalized to the case of three or more equivalent join attributes from the same relation. For instance, let $1, 2, \ldots, n$ be the equivalent join attributes of relation R and let the corresponding number of distinct values be $d_1, d_2, \ldots, d_n$. Permute $1, 2, \ldots, n$, where each $i_k$ is uniquely mapped to an index in $1, \ldots, n$ such that $d_{i1}=\min(d_{i1}, d_{i2}, \ldots, d_{in})=\min(d_1, d_2, \ldots, d_n)$, in order to get $i_1, i_2, \ldots, i_n$. Using a similar approach, $$\|R\|' = \frac{\|R\|}{(d_{i2} \times d_{i3} \times \ldots \times d_{in})}$$

and the effective number of distinct values in joins is $\min(d_{i1}, \|R\|')$, i.e., all except the smallest $d_j$ is divided into $\|R\|$ to obtain $\|R'\|$.

In the above discussion, the situation where there are 2 or more join attributes from the same relation that belong to the same equivalence class is described. This special case is handled in BASIC STEP 1. To effectuate the implementation and understanding of BASIC STEP 1, the following pseudocode is provided.

For initialization, let R denote a relation and let its cardinality be denoted by card_R. Let d_A denote the number of distinct values in join attribute (a) of relation R. Let quivalence_class[ ] be an array indicating the equivalence class to which each join attribute of relation R belongs. The assumption is that the values of the elements of the equivalence class array are initially greater than zero. Because each join attribute will contribute to the determination of the size of any join which involves relation R, if a join attribute no longer contributes to determining the size of any join involving relation R, its equivalence class is set equal to zero.

```
/* PROCEDURE TO HANDLE JOIN ATTRIBUTES FROM
RELATION R THAT BELONG TO THE SAME EQUIVA-
LENCE CLASS */
1:   more_relations := TRUE
2:
3:   while (more_relations = TRUE)
4:      R = get_next_relation()
5:      more_attributes := TRUE
6:      while(more_attributes = TRUE)
7:         join_attr_A := get_next_join_attribute(R)
8:         if (equivalence_class[join_attr_A] > 0)
9:            more_other_join_attr := TRUE
10:           while (more_other_join_attr = TRUE)
11:              join_attr_B := get_next_join_attribute(R)
12:              if ((join_attr_A ≠ join_attr_B) and
13:                 (equivalence_class[join_attr_A] =
                     equivalence_class[join_attr_B]))
14:                 if (d_A < d_B)
15:                    card_R := card_R/d_B
16:                    equivalence_class[join_attr_B] := 0
17:                 else
18:                    card_R := card_R/d_A
19:                    equivalence_class[join_attr_A] := 0
20:              if no more other join attributes then
21:                 more_other_join_attr := FALSE
22:        if no more join attributes then
23:           more_attributes := FALSE
24:     if no more relations then
25:        more_relations := FALSE
```

The temporary variable more_relations, which is set equal to the value of TRUE in Line 1, is used to exit the WHILE LOOP of Line 3 when there are no more relations to be considered. In Line 4, R is assigned the next relation to be considered. In the present example, a function get_next_relation( ) returns that relation. It should be apparent to one skilled in the art as to how to produce a function that returns the next relation. Therefore, the pseudocode for this function is not provided herein. Another temporary variable more_attributes is set equal to the value of TRUE, in Line 5, so that all the attributes in relation R will be considered. In Line 6, while there exists still more attributes in relation R, the following steps are performed. In Line 7, a temporary variable join_attr_A is assigned by a function get_next_join_attribute( ) given relation R. It should be understood by one skilled in this art as to how and where the next join attribute of relation R is found and can be returned. Therefore, the particulars of this function are not provided nor discussed herein.

In Line 8, for each join attribute (a) of relation R, if the equivalence class of attribute (a) is equal to zero then proceed to the next join attribute. If the equivalence class is not zero then iterate through all the other join attributes of relation R. In Line 9, a temporary variable more_other_join_attr is set equal to the value of TRUE because there exists other join attributes to consider. While there are other join attributes to consider, Line 11, join_attr_B is assigned the next join attribute by the get_next_join_attribute( ) function given relation R. In line 12, if some other attribute (b) belongs to the same equivalence class as attribute (a), then, if d_A, the number of distinct values of join attribute (a), is less than d_B, the number of distinct values of join attribute (b), in Line 14, then reduce card_R by d_B in Line 15 and set the value of the equivalence class of join attribute (b) equal to zero, Line 16. Otherwise, reduce card_R by d_A in Line 18 and set the value of the equivalence class of join attribute (a) equal to zero before proceeding to the next join attribute, Line 19.

Once there are no other join attributes to consider, Line 20, the variable more_other_join_attr is set equal to the value of FALSE, in Line 21, so that the control WHILE LOOP of Line 10 will exit. After there are no more join attributes in Line 22, the variable more_attributes is set equal to the value of FALSE in Line 23 so that the control WHILE LOOP of Line 6 will exit. Once there are no more relations in Line 24, the variable more_relations is then set equal to the value of FALSE in Line 24 so that the control WHILE LOOP of Line 3 will exit.

It should be understood that at the end of BASIC STEP 0 and 1, the effect of local predicates on join selectivities has been taken into account and the special case wherein multiple join attributes of a relation belong to the same equivalence class has been handled. The join selectivities can now be chosen to compute the join result sizes correctly in BASIC STEP 2.

Consider the prior example of an SQL statement entered as a query into a database wherein the wrong join result sizes were produced by the prior art methods. Such a query would again be:

SELECT $R_1.u$

FROM $R_1, R_2, R_3$

WHERE $(R_1.x=R_2.y)$ AND $(R_2.y=R_3.z)$ AND $(R_1.x=R_3.z)$

The join predicates here are $(R_1.x=R_2.y)$, $(R_2.y=R_3.z)$ and $(R_1.x=R_3.z)$. Again, let the statistics for these relations in the database be:

$\|R_1\|=100, d_x=10$ $\|R_2\|=1000, d_y=100$ $\|R_3\|=1000, d_z=1000$

Ja:$(R_1.x=R_2.y)$, $S_{Ja}=1/\max(d_x, d_y)=1/\max(10,100)=0.01$

Jb:$(R_2.y=R_3.z)$, $S_{Jb}=1/\max(d_y, d_z)=1/\max(100,1000)=0.001$

Jc:$(R_1.x=R_3.z)$, $S_{Jc}=1/\max(d_x, d_z)=1/\max(10,1000)=0.001$

Thus, using the semantics of the join operation, wherein the selectivities are given by $S_{Ja}$, $S_{Jb}$, and $S_{Jc}$, the correct result size for $\|R_1 \cup R_2 \cup R_3\|$ is 1000.

Let $R_2$ be joined first with $R_3$, i.e., let the intermediate result relation I be $R_2 \cup R_3$ then:

$\|R_2 \cup R_3\|=\|R_2\|\times\|R_3\|\times S_{Jb}$ $\|R_2 \cup R_3\|=1000\times1000\times0.001$ $\|R_2 \cup R_3\|=1000$ (known result)

In the approach of the present method of choosing join selectivities, only the largest join predicate selectivity is used. Since selectivity $(S_{Jc}<S_{Ja})$, $S_{Jc}$ is chosen and thus:

$\|R_2 \cup R_3 \cup R_1\|=\|I\|\times\|R_1\|\times S_{Jc}$ $\|R_2 \cup R_3 \cup R_1\|=1000\times100\times0.01$ $\|R_2 \cup R_3 \cup R_1\|=1000$ (correct result).

As shown, the present method produced the correct join result size in this example by choosing the join selectivity correctly. In order to effectuate the implementation and understanding of BASIC STEP 2 wherein the join selectivities are correctly chosen the following pseudocode is provided.

Initially, denote the cardinality of relation R by card_R, the cardinality of intermediate relation I by card_I, and the size of the join of relation R with intermediate relation I by card_IR. Relation R participates in several join predicates. When the relation R is to be joined, some of its join predicates become eligible to be joined. Note that a join predicate linking relation R and relation S is eligible if relation S is present in the intermediate result that is to be joined with relation R. During transitive closure of predicates, equivalence classes of join attributes are formed wherein each join attribute belongs to some equivalence class. Denote the total number of equivalence classes by K and the array of join selectivities associated with these equivalence classes by eq_join_sel[ ]. With each equivalence class, the present method will associate a join selectivity.

```
/* PROCEDURE TO CHOOSE THE JOIN SELECTIVITIES
TO COMPUTE JOIN RESULT SIZES */
1:   Let K denote the total number of equivalence classes
2:
3:   for (i := 1; i ≤ K; i := i+1)
4:       eq_join_sel[i] := 0
5:   more_exists := TRUE
6:   while(more_exists = TRUE)
7:       join_pred := get_next_join_predicate()
8:       join_attr := join attribute of relation R in join_pred
9:       k := equivalence_class[join_attr]
10:      join_sel := join selectivity of join_pred
11:      if (join_sel > eq_join_sel[k])
12:          eq_join_sel[k] := join_sel
13:      if (no more join predicates)
14:          more_exists := FALSE
15:
16:  card_IR := card_I × card_R
17:  for (k := 1; k ≤ K; k := k+1)
18:      if (eq_join_sel[k]>0)
19:          card_IR := card_IR × eq_join_sel[k]
```

In lines 3–4, all elements of array eq_join_sel[ ] are initialized to 0, i.e., the join selectivities of the equivalence classes are reset. A temporary variable more_exists is set equal to the value of TRUE in Line 5. Then, while there are more join predicates in Line 6, iterate through the list of eligible join predicates. The next join predicate is returned by the function get_next_join_predicate( ) in Line 7 and assigned to the variable join_pred. Since the retrieval of a join predicate is well known in the art, the substance of this function is not provided herein. The join attribute of relation R in the returned join predicate is retrieved and assigned to the variable join_attr in Line 8. Next, the equivalence class of the retrieved join attribute is assigned to a temporary variable k from the equivalence class array in Line 9, and the join selectivity of the join predicate is assigned to the local variable join_sel. If the join selectivity is strictly greater than the array value of eq_join_sel[k], Line 11, then set eq_join_sel[k] to join_sel in Line 12 because the present method always picks the largest join selectivity. In Line 13, if more join predicates exist to be considered then continue to process the remaining join predicates. Else, the value of the temporary variable more_exists is set equal to the value of FALSE in Line 14 so that the control WHILE LOOP of Line 6 will exit. After the execution of Lines 1–15 completes, the join selectivities to be used are available in the array eq_join_sel[ ] indexed by the equivalence classes.

In Line 16, set the size of the join result (or card_IR) equal to the value of the size of the intermediate relation I multiplied by the size of the relation R. This initializes card_IR wherein the effects of the join selectivities have not been taken into account yet. Next in Line 17, for each equivalence class, if the value of eq_join_sel[k] is greater than 0, multiply card_IR by eq_join_sel[k] to produce the correct value of the size of the join result.

The estimation of join result sizes is reduced to choosing the join selectivities for the equivalence classes. Since two join predicates on the same join attribute of the new relation will correspond to the same equivalence class, the present method correctly handles the case when two or more eligible join predicates involve the same join attribute of the new relation.

In general, the following shows that the present method correctly chooses the join selectivities. In order to show this, two equations known in the art are first described.

For joining two relations $R_1$ and $R_2$, the size of the result is given by $\|R_1\| \times \|R_2\| \times 1/\max(d_1, d_2)$, where $d_1$ and $d_2$ denote the number of distinct values in the join attributes of $R_1$ and $R_2$ respectively. If the selectivity is represented as $S_{Ja}=1/\max(d_1, d_2)$, then this can be written as $\|R_1 \cup R_2\|=\|R_1\| \times \|R_2\| \times S_{Ja}$. This is referred to herein as Equation 1, where selectivity $S_{Ja}$ denotes the join selectivity of the join predicate linking $R_1$ and $R_2$. Since, $1/\max(d_1, d_2)=\min(d_1, d_2)/(d_1 \times d_2)$, it should be understood that Equation 1 can be rewritten as $$\|R_1 \cup R_2\| = \min(d_1, d_2) \times \frac{\|R_1\| \times \|R_2\|}{d_1 \times d_2} .$$

Secondly, denote the result of joining relations $R_1, R_2, \ldots, R_n$ by $R_1^n$. Consider only the join predicates in a single equivalence class and let the relations $R_1, R_2, \ldots, R_n$ be joined such that all the join predicates linking any two relations together form an equivalence class. Permute $1, 2, \ldots, n$, where each $i_k$ is uniquely mapped to an index in $1, \ldots, n$ such that: $d_{i1}=\min(d_{i1}, d_{i2}, \ldots, d_{in})=\min(d_1, d_2, \ldots, d_n)$, in order to get $i_1, i_2, \ldots, i_n$. It can be shown that the size of the intermediate result $R_1^n$ is given as $$\|R_1^n\| = d_{i1} \times \frac{\|R_1\| \times \|R_2\| \times \ldots \times \|R_n\|}{d_{i2} \times d_{i3} \times \ldots \times d_{in}} ,$$

where $d_{i1}=\min(d_{i1}, d_{i2}, \ldots, d_{in})$. This will be referred to as Equation 2.

The size of relation $R_1^n$ has been calculated. Now join relation $R_{n+1}$ to obtain the result relation $R_1^{n+1}$. For each attribute of relation $R_{n+1}$ that joins with some attribute of $R_1^n$, the present method obtains the join selectivity that will participate in the calculation of result size $\|R_1^{n+1}\|$.

The base case for the induction is when two relations, $R_1$ and $R_2$ are joined. The present method calculates the result size to be $\|R_1\| \times \|R_2\| \times S_{Ja}$ which satisfies Equation 1.

In the case where there are multiple relations, Equation 2 needs to be satisfied. This is shown as follows.

Assume that the smallest of $d_1$ through $d_n$ has not been used in the calculation of size $\|R_1^n\|$. This minimum is denoted by d by $d_{min}$, i.e, $d_{min}=\min(d_1, d_2, \ldots, d_n)$, and let the corresponding relation is $R_{min}$. The number of distinct values in the join attribute of relation $R_{n+1}$ is given by $d_{n+1}$.

To satisfy Equation 2, consider two cases. In the first case, where $d_{min} \geq d_{n+1}$ consider the join predicate joining relations $R_{n+1}$ and $R_{min}$. By the definition of the join selectivity of Equation 1, this join predicate will have a join selectivity given by $S_{Ja}=1/(d_{min})$. Since the assumption is that $d_{min}$ is the smallest of $d_1$ through $d_n$, it should be appreciated that $d_{n+1}$ must be smaller than any of $d_1$ through $d_n$. As such, it will not be used in any of the join selectivities by the present method. Hence, selectivity $S_{Ja}$ is the largest of the available join selectivities and therefore will be selected by the present method. The result size obtained thereby is given as $$\|R_1^{n+1}\| = \|R_1^n\| \times \|R_{n+1}\| \times S_{Ja} = \frac{\|R_1^n\| \times \|R_{n+1}\|}{d_{min}} ,$$

which satisfies Equation 2 because the only distinct value $d_i$ not used in the calculation of $\|R_1^{n+1}\|$ is $d_{n+1}$ which is the smallest of $d_1$ through $d_{n+1}$.

In the second case, where $(d_{n+1}>d_{min})$, consider the join predicate joining relation $R_{n+1}$ and relation $R_{min}$. By the definition of the join selectivity of Equation 1, this join predicate will have a join selectivity given by $S_{Jb}=1/(d_{n+1})$.

Consider any of the other equivalent join predicates with the number of distinct values in the corresponding relation given by $d_i$. If $(d_{n+1} \geq d_i)$, the join selectivity is given by $S_{Jb}$. If $(d_{n+1}<d_i)$, the join selectivity is of the form $S_{Jc}=1/(d_i)$, where $d_i$ is one of the distinct values $d_1$ through $d_n$ excluding the minimum distinct value $d_{min}$. Thus, any join selectivity of the form $S_{Jc}$ is less than $S_{Jb}$ Since the corresponding distinct value $d_i$ is larger than $d_{n+1}$. Hence, the present method will not choose a join selectivity of the form $S_{Jc}$ but instead will choose one of the join selectivities having the identical selectivity value $S_{Jb}$. The result size obtained thereby is given as $$\|R_1^{n+1}\| = \|R_1^n\| \times \|R_{n+1}\| S_{Jb} = \frac{\|R_1^n\| \times \|R_{n+1}\|}{d_{n+1}} ,$$

which satisfies Equation 2 because the only distinct value $d_i$ not used in the calculation of $\|R_1^{n+1}\|$ is $d_{min}$, which is the smallest of $d_1$ through $d_{n+1}$.

In summary, the present invention provides a method that correctly chooses the join selectivities to be used when calculating join result sizes. For each relation, an estimate of the cardinality and the number of distinct values in each attribute is computed after all the local predicates have been included. These new estimates are used in further computation of join selectivities and join result sizes. The join predicates then must be processed by correctly choosing the join selectivities. The join result sizes can then be correctly calculated. The present method handles the case when two or more eligible join predicates involve the same join attribute of the new relation and the case when two or more of the eligible join predicates involve join attributes of the new relation having the same equivalence class.

This invention may be embodied in other specific forms without departing from its spirit or essential characteristics. The above-described embodiments of the present invention are to be considered in all respects only as illustrative and not restrictive in scope. The scope of the invention is, therefore, indicated by the appended claims rather than by the above-detailed description. Therefore, all changes which come within the meaning and range of equivalency of the claims are to be considered embraced within their scope.

What is claimed and desired to be secured by United States Letters Patent is:

1. A computer program product for use in a query optimizer in a relational database computer system wherein selectivity values for each eligible join predicate are known comprising:

a recording medium;

means, recorded on said recording medium, for instructing said computer system to determine the equivalence classes for a plurality of join attributes; and means, recorded on said recording medium, for instructing said computer system, for each equivalence class to:
  1) determine the eligible join predicates belonging to each of said equivalence classes; and
  2) choose the largest selectivity among said eligible join predicates in each of said equivalence classes.

* * * * *